Patented Sept. 18, 1945

2,385,240

UNITED STATES PATENT OFFICE 2,385,240

AQUEOUS SOYBEAN PROTEIN COMPOSITIONS

Harris O. Ware, Kalamazoo, Mich., assignor to Hercules Powder Company, Wilmington, Del., a corporation of Delaware No Drawing. Application May 6, 1941,
Serial No. 392,133

8 Claims. (Cl. 106—154)

This invention relates to soybean protein compositions suitable for use in the manufacture of glues, sizes, paints, and similar coating compositions, and in particular concerns aqueous soybean compositions which are capable of forming water-resistant films or coatings upon drying.

Although soybean protein, either in isolated form or in the form of soybean flour or meal, has found considerable use in the preparation of aqueous compositions adapted to being employed in the sizing of paper and like fibrous articles, as well as in the manufacture of adhesives and glues, the field of use of such compositions is greatly limited by their tendency to putrefy and/or undergo changes in viscosity upon storage for even short periods of time and by the poor water-resistance of the protein coatings deposited therefrom.

It is accordingly an object of this invention to provide improved aqueous soybean protein compositions adapted to a wide variety of uses.

Another object is to provide aqueous soybean compositions from which highly water-resistant coatings and films may be deposited.

A further object is to provide aqueous soybean protein compositions which are more stable to putrefaction than the compositions heretofore known.

Other objects will be apparent from the following detailed description of the invention, and many advantages other than those referred to herein will occur to those skilled in the art upon employment of the invention in practice.

In accordance with the objects of the invention, I have found that aqueous alkaline soybean protein solutions or dispersions to which has been added a small proportion of a zinc, cadmium, or magnesium amine complex compound are relatively stable towards putrefaction and viscosity changes, and that upon drying the protein becomes highly water-resistant and at least partially water-insoluble by what is believed to be the formation of a metal proteinate. Accordingly, the improved compositions provided by the invention consist essentially of aqueous alkaline solutions or dispersions of soybean protein having dissolved therein an amine complex compound of at least one of the metals: zinc, cadmium, and magnesium.

The soybean protein employed in preparing the new compositions is preferably an isolated and purified material such as is obtained by extracting oil-free soybean flour or meal with an alkali and thereafter precipitating the protein from the extract by the addition of an acid, or by extracting oil-free flour or meal with an acid of such strength that the impurities are dissolved leaving the protein in a substantially pure and unchanged state. If desired, however, the oil-free soybean meal or flour itself may be employed according to the invention, although the compositions so prepared are not usually as satisfactory as those prepared from the isolated protein. It will accordingly be understood that the term "soybean protein" as employed hereinafter includes soybean flour and meal as well as the isolated protein material.

According to a preferred embodiment of the invention, the new compositions are prepared simply by stirring a dry mixture of soybean protein and a water-soluble zinc, cadmium, or magnesium salt into aqueous ammonia until a smooth homogenous solution or dispersion is obtained. Alternatively, the soybean protein may be dissolved or dispersed in aqueous ammonia and the metal amine complex compound added in aqueous ammoniacal solution. Such solution is conveniently prepared by adding aqueous ammonia to an aqueous solution of a zinc, cadmium or magnesium salt, e. g., zinc sulphate, magnesium chloride, zinc chloride, cadmium bromide, magnesium sulphate, zinc ammonium sulphate, cadmium nitrate, magnesium nitrate, cadmium chloride, etc., until the initial precipitate of metal hydroxide is dissolved. Also, the soybean protein may be dissolved or dispersed in a dilute aqueous alkali, e. g., sodium hydroxide, sodium carbonate, borax, potassium carbonate, etc., and a solution of the metal amine complex compound added as described above. Such mode of procedure, however, is somewhat less desirable than those previously described since the presence of a nonvolatile alkali in the composition tends to decrease the water-resistance and insolubility of the protein films deposited therefrom.

If desired, a water-soluble primary aliphatic amine, such as methylamine, propylamine, monoethanolamine, ethylenediamine, allylamine, etc., may be employed in place of ammonia in preparing the metal amine complex compound. For example, zinc chloride may be dissolved in an aqueous solution of methylamine, whereby there is formed a zinc amine complex compound, and the resulting solution may then be added to an alkaline solution or dispersion of soybean protein to obtain a composition similar to those prepared as described above. Such a composition is particularly advantageous for use in cases where it is desired to avoid the presence of ammonia vapors.

The proportion of metal amine complex compound required to render the soybean protein sufficiently water-resistant depends upon the particular compound employed as well as upon the concentration of the alkaline protein solution. In most cases, however, sufficient of the amine complex compound to provide at least 0.03 moles of the metal ion per 100 grams of dry protein will be required, and in general, from about 0.03 to about 0.30, preferably from about 0.09 to about 0.12, moles of the metal ion per 100 grams of dry protein will be found to be satisfactory.

The compositions may be prepared in any suitable concentration, but it will be found that those containing from about 10 to about 20 per cent by weight of solids are most satisfactory for use as sizing or coating compositions, paints, etc. Similarly, the alkalinity of the compositions is preferably maintained at a pH value below about 11, since at higher alkalinity the composition becomes somewhat disagreeable to handle and the soybean protein has a tendency to become denatured.

While the new and improved aqueous soybean protein compositions have been described above as consisting essentially of an alkaline solution of soybean protein containing a zinc, cadmium, or magnesium amine complex compound, it will be understood that for many applications it will be desirable to include such additional materials as dyes, pigments, fillers, pulp stock fibers, etc. Also, plasticizers, such as wax dispersions, sulphonated castor oil, glycerin, etc., may be added for the purpose of increasing the flexibility and adherence of the coating or film deposited from the composition.

The aqueous compositions herein described may be used as sizing agents for paper and other fibrous articles, or may be used as a base for water vehicle paints. They may also be employed as adhesives for gluing ply-boards, veneer, spirally wound tubing or containers, or in connection with fiber molding compositions. Still other uses are as a vehicle for water inks, a film-forming base material for the manufacture of pigment-coated papers, a sealing coat for printed or dyed surfaces or in dye compositions for printing papers or textiles, and for making washable wall paper. They may be applied by brushing, spraying or calendering, or they may be incorporated directly with pulp fiber prior to web formation. If desired, they may also be employed as impregnating media. Regardless of the manner of application, however, as the composition dries, the metal amine complex compounds is decomposed and the metal ions react with the soybean protein to form films which have excellent water-resistance.

The following examples illustrate several ways in which the principle of the invention has been applied, but are not to be construed as limiting the same.

Example I

Approximately 166 parts by weight of isolated soybean protein were allowed to swell in 816 parts by weight of water at a temperature of about 30° C., after which 18 parts by weight of 28% aqueous ammonia were gradually added with stirring. Stirring was continued until a smooth solution was obtained, after which there was added approximately 67 parts by weight of zinc ammonium sulphate $(ZnSO_4(NH_4)_2SO_4 \cdot 6H_2O)$ in dilute aqueous solution. The resultant mixture was a cream-colored stable solution which, when applied as a coating, dried and liberated ammonia to form a smooth adherent film which was approximately 70% insoluble in water.

Example II

Approximately 166 parts by weight of isolated soybean protein were allowed to swell in 816 parts by weight of water as in Example I, to which mixture there was then added an aqueous solution of zinc propylamine complex prepared by adding an aqueous solution of about 22.6 parts by weight of zinc chloride to 73.6 parts by weight of propylamine. The resulting mixture was stirred until homogeneous, whereby there was obtained a smooth cream-colored solution which, when applied as a coating, dried to form a smooth adherent film which was approximately 53% insoluble in water.

Example III

Approximately 10.0 parts by weight of isolated soybean protein were allowed to swell in 45 parts by weight of water, to which mixture there was then added 1.10 parts by weight of cadmium nitrate $(Cd(NO_3)_2 \cdot 4H_2O)$. The resulting mixture was stirred until the salt had completely dissolved whereupon, 5.4 parts of 28% aqueous ammonia were added. Stirring was continued until a smooth, cream-colored solution was obtained which, when applied as a coating, dried to form a smooth adherent film which was approximately 84% insoluble in water.

Other modes of applying the principle of my invention may be employed instead of those explained, change being made as regards the methods or ingredients disclosed, provided the composition stated by any of the following claims, or the equivalent of such stated composition, be obtained.

What I claim and desire to protect by Letters Patent is:

1. A water-resistant coating composition which is substantially stable to putrefaction and viscosity changes which consists of soybean protein, a water-soluble salt of a metal selected from the class consisting of zinc, cadmium, and magnesium, and an aqueous medium selected from the class consisting of aqueous ammonia and aqueous primary aliphatic amines, said metal salt being present in an amount between about 0.03 mole and about 0.3 mole of metal ion per 100 grams of soybean protein, said composition having a pH below about 11.

2. A water-resistant coating composition which is substantially stable to putrefaction and viscosity changes, which comprises soybean protein, an aqueous dispersion medium selected from the group consisting of aqueous ammonia and aqueous primary aliphatic amines, and, as the essential water-resistive agent, a water-soluble salt of a metal selected from the group consisting of zinc, cadmium, and magnesium, said metal salt being present in an amount between about 0.03 mole and about 0.3 mole per 100 grams of soybean protein, said composition having a pH below about 11.

3. A water-resistant coating composition which is substantially stable to putrefaction and viscosity changes, which comprises soybean protein, an aqueous dispersion medium selected from the group consisting of aqueous ammonia and aqueous primary aliphatic amines, and, as the essential water-resistive agent, a water-soluble salt of zinc, said zinc salt being present in an amount between about 0.03 mole and about 0.3 mole per 100 grams of soybean protein, said composition having a pH below about 11.

4. A water-resistant coating composition which is substantially stable to putrefaction and viscosity changes, which comprises soybean protein, an aqueous dispersion medium selected from the group consisting of aqueous ammonia and aqueous primary aliphatic amines, and, as the essential water-resistive agent, a water-soluble salt of cadmium, said cadmium salt being present in an amount between about 0.03 mole and about 0.3 mole per 100 grams of soybean protein, said composition having a pH below about 11.

5. A water-resistant coating composition which is substantially stable to putrefaction and viscosity changes, which comprises soybean protein, an aqueous dispersion medium selected from the group consisting of aqueous ammonia and aqueous primary aliphatic amines, and, as the essential water-resistive agent, a water-soluble salt of magnesium, said magnesium salt being present in an amount between about 0.03 mole and about 0.3 mole per 100 grams of soybean protein, said composition having a pH below about 11.

6. A water-resistant coating composition which is substantially stable to putrefaction and viscosity changes, which comprises soybean protein, an aqueous dispersion medium selected from the group consisting of aqueous ammonia and aqueous primary aliphatic amines, and, as the essential water-resistive agent, a water-soluble salt of a metal selected from the group consisting of zinc, cadmium, and magnesium, said metal salt being present in an amount between about 0.09 mole and about 0.12 mole per 100 grams of soybean protein, said composition having a pH below about 11.

7. A water-resistant coating composition which is substantially stable to putrefaction and viscosity changes, which comprises soybean protein, an aqueous dispersion medium selected from the group consisting of aqueous ammonia and aqueous primary aliphatic amines, and, as the essential water-resistive agent, a water-soluble salt of a metal selected from the group consisting of zinc, cadmium, and magnesium, said metal salt being present in an amount between about 0.03 mole and about 0.3 mole per 100 grams of soybean protein, said composition containing from about 10% to about 20% by weight of solids, and having a pH below about 11.

8. A water-resistant coating composition which is substantially stable to putrefaction and viscosity changes, which consists of soybean protein, a water-soluble salt of zinc, and an aqueous dispersion medium of aqueous ammonia, said zinc salt being present in an amount between about 0.03 mole and about 0.3 mole per 100 grams of soybean protein, said composition having a pH below about 11.

HARRIS O. WARE.